United States Patent
Holm et al.

(10) Patent No.: US 9,970,183 B2
(45) Date of Patent: May 15, 2018

(54) FLUSHING ASSEMBLY

(71) Applicant: ALFA LAVAL CORPORATE AB, Lund (SE)

(72) Inventors: Martin Holm, Lund (SE); Anders Nyander, Staffanstorp (SE)

(73) Assignee: ALFA LAVAL CORPORATE AB, Lund (SE)

( * ) Notice: Subject to any disclaimer, the term of this patent is extended or adjusted under 35 U.S.C. 154(b) by 0 days. days.

(21) Appl. No.: 15/316,002

(22) PCT Filed: Apr. 20, 2015

(86) PCT No.: PCT/EP2015/058471
§ 371 (c)(1),
(2) Date: Dec. 2, 2016

(87) PCT Pub. No.: WO2015/185257
PCT Pub. Date: Dec. 10, 2015

(65) Prior Publication Data
US 2017/0121951 A1  May 4, 2017

(30) Foreign Application Priority Data
Jun. 5, 2014 (EP) .................................... 14171280

(51) Int. Cl.
*A47K 3/022* (2006.01)
*E03C 1/00* (2006.01)
*F28D 21/00* (2006.01)

(52) U.S. Cl.
CPC .......... *E03C 1/00* (2013.01); *E03C 2001/005* (2013.01); *F28D 21/0012* (2013.01)

(58) Field of Classification Search
CPC ... E03C 1/00; E03C 2001/005; F28D 21/0012
(Continued)

(56) References Cited

U.S. PATENT DOCUMENTS 3,263,242 A * 8/1966 Will ...................... A47K 3/283
4/598
4,291,423 A    9/1981 Wilson
(Continued)

FOREIGN PATENT DOCUMENTS

DE       196 08 404 A1   5/1997
DE    102007027316 B3   1/2009
(Continued)

OTHER PUBLICATIONS

International Search Report (PCT/ISA/210) dated Jun. 30, 2015, by the European Patent Office as the International Searching Authority for International Application No. PCT/EP2015/058471.
(Continued)

*Primary Examiner* — Huyen Le
(74) *Attorney, Agent, or Firm* — Buchanan Ingersoll & Rooney PC

(57) ABSTRACT

A flushing assembly comprising a foundation and a heat exchanging member. The foundation comprises a bowl shape providing an envelope surface defining an upper inlet and a lower outlet, the lower outlet being arranged to communicate with a drainage. The heat exchanging member comprises a helical channel defined between an upper and a lower wall, the helical channel having an extension along the envelope surface of the bowl shaped foundation, and the helical channel being arranged to be provided with a through flow of a secondary fluid. The flushing assembly is configured to provide a helical channel for a primary fluid extending between the envelope surface of the foundation and the lower wall of the heat exchanging member for guiding the primary fluid there through from the upper inlet to the lower outlet towards the drainage, thereby allowing heat exchange between the primary fluid and the secondary fluid.

13 Claims, 3 Drawing Sheets

(58) Field of Classification Search
USPC .......................................................... 4/598
See application file for complete search history.

(56) References Cited

U.S. PATENT DOCUMENTS

| | | | |
|---|---|---|---|
| 4,304,292 | A | 12/1981 | Cardone et al. |
| 4,542,546 | A * | 9/1985 | Desgagnes ................ E03C 1/12 165/66 |
| 6,289,977 | B1 | 9/2001 | Claudel et al. |
| 8,893,319 | B2 * | 11/2014 | Gilbert ...................... E03C 1/00 4/598 |
| 2009/0183862 | A1 | 7/2009 | Benezech et al. |
| 2010/0212878 | A1 | 8/2010 | Cai |
| 2010/0270009 | A1 | 10/2010 | Kim |
| 2011/0289674 | A1 | 12/2011 | Rusch |
| 2017/0198982 | A1 * | 7/2017 | Tornquist ............ F28D 21/0012 |

FOREIGN PATENT DOCUMENTS

| | | |
|---|---|---|
| EP | 2 224 197 A2 | 9/2010 |
| GB | 2 232 749 A | 12/1990 |
| JP | 2001502409 A | 2/2001 |
| JP | 2007518053 A | 7/2007 |
| NL | 1009927 A1 | 6/2000 |
| WO | 2010084620 A1 | 7/2010 |
| WO | WO 2012/099476 A1 | 7/2012 |
| WO | WO 2013/037381 A1 | 3/2013 |

OTHER PUBLICATIONS

Written Opinion (PCT/ISA/237) dated Jun. 30, 2015, by the European Patent Office as the International Searching Authority for International Application No. PCT/EP2015/058471.

Office Action (Notice of Reasons for Rejection) dated Dec. 7, 2017, by the Japanese Patent Office in Japanese Patent Application No. 2016-571153, and an English Translation of the Office Action. (9 pages).

* cited by examiner

FLUSHING ASSEMBLY

TECHNICAL FIELD

The invention relates to a flushing assembly.

BACKGROUND ART

When a process involving consumption of heated water is carried out it is often the case that a flow of used warm water is allowed to flow to waste. Thereby potentially useful thermal energy is wasted. In certain circumstances a heat exchanger could be utilized to reclaim some of the thermal energy.

As a non-limiting example, such a heat exchanger would by way of example be applicable to a shower where the heat transfer takes place from the waste water, being the primary fluid, to the cold water supply, being the secondary fluid, in order of pre-heating the same. This is an example of a typical grey water application. The very same principle is by way of example equally applicable in so called red water applications, i.e. slaughter houses, or other applications involving flushing of tempered water. Accordingly, the principle is applicable to any scavenging plate.

This type of heat exchangers are well known in the art. Examples are by way of example to be found in GB2 232 749 A, WO2013037381, DE19608404, WO2012099476 and NL1009927 which all apply to shower applications. Although these known solutions may provide a proper heat exchange, it is likely to believe that they are less suitable when it comes to cleaning. These shower systems do all provide an enlarged contact surface for the waste water before reaching the sewer with its water seal and grating, which contact surface has not only restricted access but also exhibits many spaces forming possible traps for residues. Accordingly there is a need for a flushing assembly allowing an efficient heat transfer, while still being easy to maintain in terms of cleaning.

SUMMARY

It is an object of the invention to at least partly overcome one or more of the above-identified limitations of the prior art. In particular, it is an object to provide a flushing assembly comprising a heat exchanging member where all parts are easy accessible and which allows an easy cleaning.

Another object is to provide a flushing assembly providing a large heat transferring surface although limited to available standard areas such as the flooring of a shower.

To solve at least these objects it is provided a flushing assembly comprising a foundation and a heat exchanging member, the foundation comprising a bowl shape providing an envelope surface defining an upper inlet and a lower outlet, the lower outlet being arranged to communicate with a drainage, and the heat exchanging member comprising a helical channel defined between an upper and a lower wall, the helical channel having an extension along the envelope surface of the bowl shaped foundation, and the helical channel being arranged to be provided with a through flow of a secondary fluid, wherein the flushing assembly is configured to provide a helical channel for a primary fluid extending between the envelope surface of the foundation and the lower wall of the heat exchanging member for guiding the primary fluid there through from the upper inlet to the lower outlet towards the drainage, thereby allowing heat exchange between the primary fluid and the secondary fluid.

The flushing assembly is advantageous in that the bowl shaped foundation with its upper inlet and lower outlet will use a gravity flow of the primary fluid such as waste water supplied to the flushing assembly.

By the heat exchanging member cooperating with the bowl shaped foundation, thereby defining a channel for primary fluid there between, the primary fluid will primarily be in contact with two major surfaces—the envelope surface of the foundation and the lower wall of the heat exchanging member and thus the outer wall of the helical channel containing the secondary fluid such as cold water. By the helical extension of the channel for primary fluid, the residence time of the primary fluid, and thereby the available time for heat transfer between the primary fluid and the secondary fluid will be enhanced.

Further, by the helical channel of the heat exchanging member being arranged to extend along the envelope surface of the bowl shaped foundation, the helical channel will automatically have a corresponding bowl shaped longitudinal extension. Any flow of primary fluid along the upper wall of the heat exchanger plate will hence flow along the upper wall of the helical channel of the heat exchanging member, thereby providing an additional contact surface for heat transfer with the secondary fluid in said helical channel. Accordingly, the primary fluid is allowed to be in contact with two surfaces of the heat exchanging plate, thereby allowing a more efficient heat transfer. This is advantageous where the flushing assembly is arranged in facilities such as showers or cabins therefore having a standardized surface area essentially corresponding to the flooring area.

The upper and the lower walls of the heat exchanging member may be provided by pressed sheet metal, the walls being formed and joined to define said helical channel. The helical channel of the heat exchanging member may be formed by a pressed pattern in the upper and/or the lower wall of the heat exchanging member.

Accordingly, by such pressed pattern, the upper surface of the upper wall of the heat exchanging member will receive a helically formed groove allowing a flow of primary fluid in a helical path along the upper surface of the heat exchanging member. It is to be understood that the cross sectional profile of the channel forming portions of the upper and lower walls of the heat exchanging member must not be the same. One of the two walls may be non-profiled whereas the other wall may be provided with a profile making up the helical channel.

The envelope surface of the foundation may be provided with a helical groove. By the helical groove, the residence time and thereby the available thermal transfer time will be increased.

The envelope surface of the foundation and the lower wall of the heat exchanging member may be arranged in contact with each other, whereby the envelope surface of the foundation together with the lower wall of the heat exchanging member define the helical channel there between. The contact between the envelope surface of the foundation and the lower wall of the heat exchanging member may be direct or indirect. In case of indirect contact an intermediate sealing may be arranged there between. Also, the contact may be continuous or discontinuous.

The flushing assembly may further comprise a flooring arranged above the heat exchanging member. The flooring may have a crowning towards the upper inlet of the foundation.

The flushing assembly may further comprise a distributor adapted to primarily guide the primary fluid towards the helical channel extending between the envelope surface of the foundation and the lower wall of the heat exchanging member.

Accordingly, by such distributor, the primary fluid will primarily be guided towards the channel defined between the foundation and the heat exchanging member while any excessive flow that cannot be handled by the helical channel instead will flow along the upper surface of the heat exchanging member.

The helical groove in the envelope surface of the foundation may have a bottom wall portion, an upstream side wall portion and a downstream side wall portion and wherein the downstream side wall portion comprises a ridge. Further, a bottom wall of the helical channel of the heat exchanging member may have a cross sectional profile which at least partly extends down into the helical groove of the foundation, and wherein a lower most point of the bottom wall extends below the ridge of the helical groove of the foundation. Accordingly, during operation, even during a low flow of primary fluid, the bottom wall of the heat exchanging member will be immersed in the primary fluid. Thereby the contact surface between the primary fluid and the secondary fluid will be increased, enhancing the heat transfer there between.

The heat exchanging member may be a hydroformed structure.

The flushing assembly may be a shower flooring or a scavenging plate.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 discloses a first embodiment of the flushing assembly according to the present invention.

DETAILED DESCRIPTION

Figure 1:
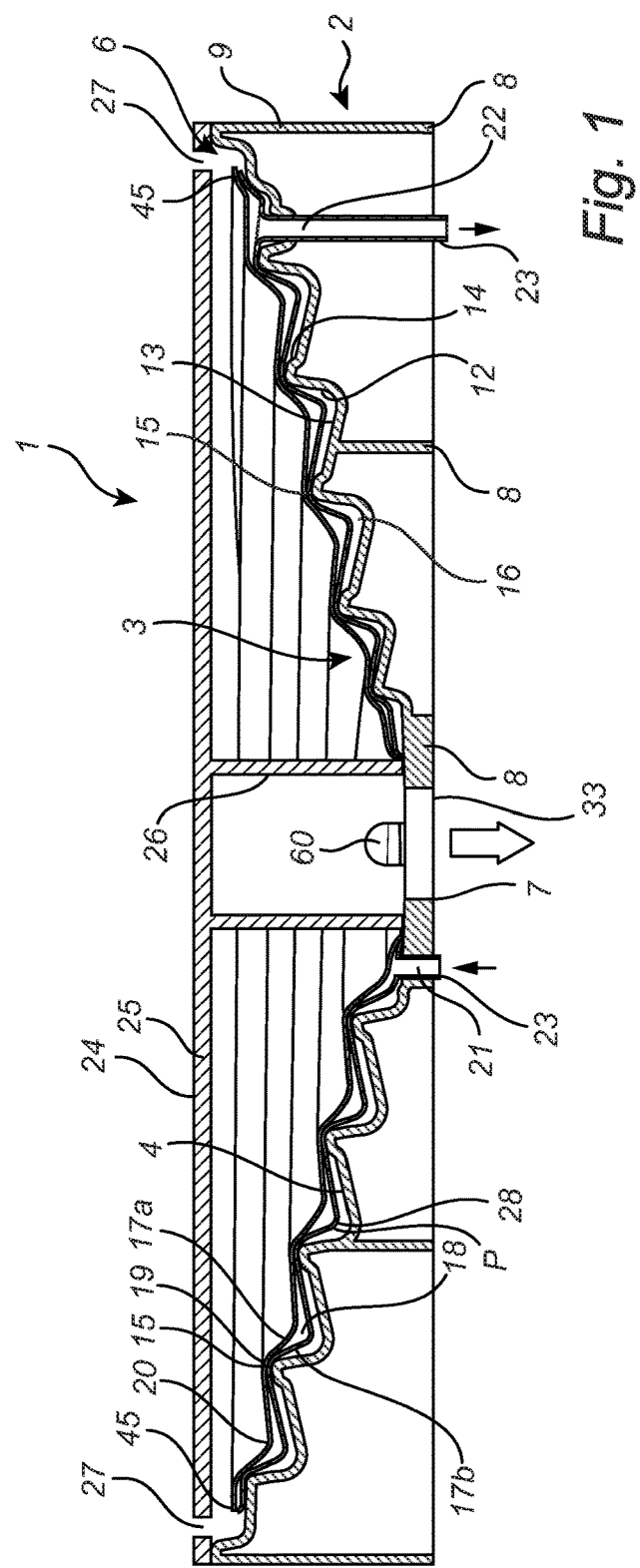

With reference to FIG. 1 one embodiment of the inventive flushing assembly 1 is illustrated. The flushing assembly 1 comprises a foundation 2, a heat exchanging member 3 and a flooring 24.

In the following description the terms convex and concave will be used. By a convex geometry is meant a protruding geometry having an envelope surface facing away from a generally horizontal plane. Correspondingly, by a concave geometry is meant a recessed geometry having an envelope surface facing away from a generally horizontal plane.

Figure 2:
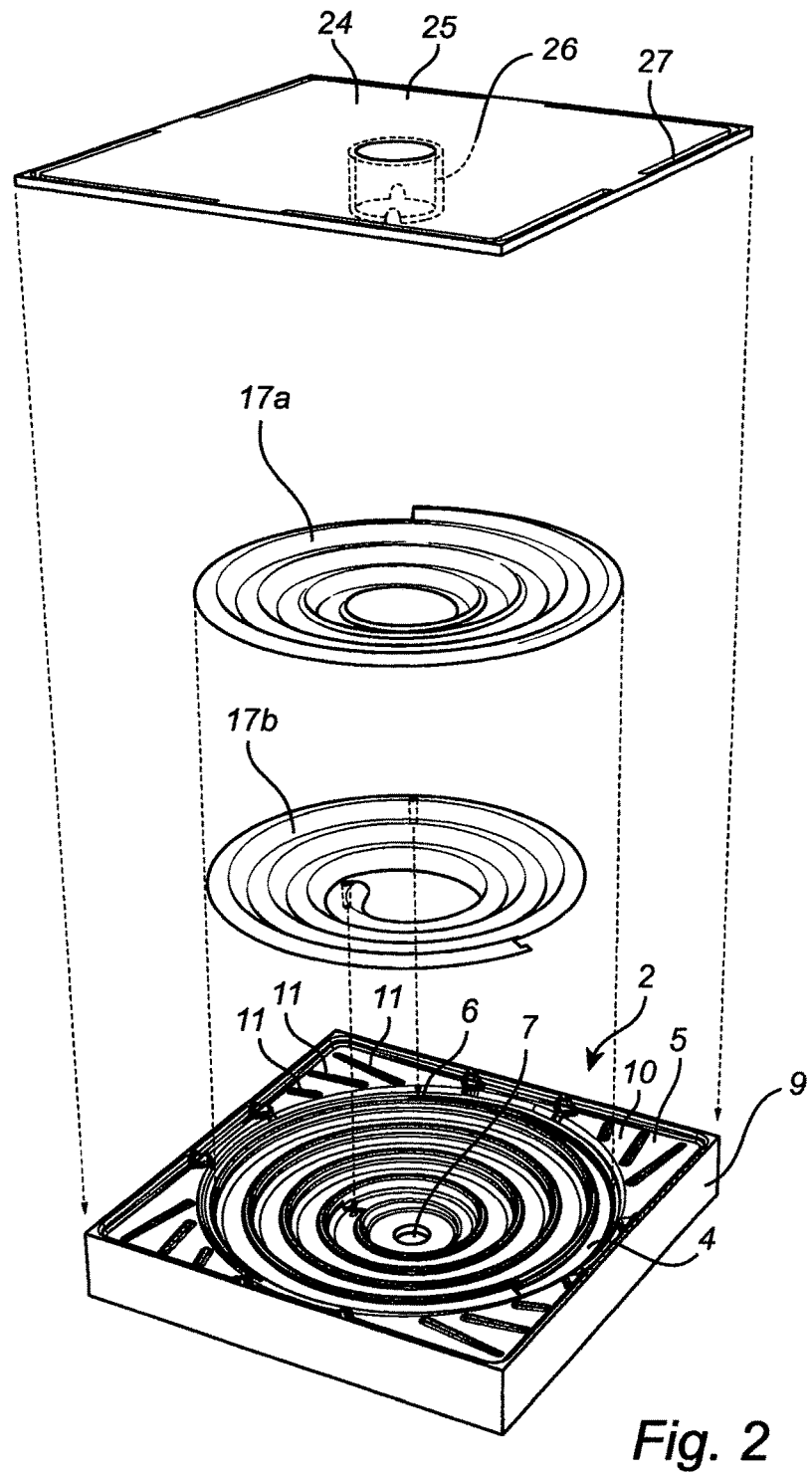
FIG. 2 is a perspective view of the foundation.

Now turning to FIG. 2, one embodiment of the foundation 2 is disclosed. The foundation 2 is disclosed as a unit to be placed resting on the ground. It is to be understood that the foundation 2 alternatively may be arranged as a recess in the ground.

In the disclosed embodiment the foundation 2 has a concave bowl shape arranged in a quadrangular frame 9. The frame 9 comprises a generally flat top surface 10. The top surface 10 is preferably slightly inclined towards a helical groove 4 that extends along the upper envelope surface 5 of the foundation 2. The helical groove 4 extends between an upper inlet 6 to a lower outlet 7. The inclination of the top surface towards the helical groove provides a runoff of fluid towards the helical groove 4.

In the disclosed embodiment the top surface 10 comprises a number of ridges 11 extending with an angle towards the helical groove 4. The ridges 11 are arranged to distribute fluid meeting the top surface along the extension of the upper most winding of the helical groove 4.

The foundation 2 may be arranged as a homogenous structure or as a shell structure. In the embodiment of FIG. 1 the foundation 2 is arranged in the form of a shell resting on three support surfaces 8.

The lower outlet 7 is arranged to be connected to a drainage 33, which connection may be made by well known means in the art. Due to the concave bowl shape of the foundation, the upper inlet is arranged in the upper peripheral portion of the helical groove 4 and the lower outlet 7 in the lower central portion of the foundation 2.

The foundation 2 may by way of example be made of metal, a reinforced composite material, plastics or a stone based material. The helical groove 4 together with the ridges 11 and the top surface 10 may be a pressed, moulded or machined geometry.

Now specifically turning to FIG. 1, the helical groove 4 has a transverse cross section with, as seen in the flow direction, an upstream side wall portion 12, a bottom wall portion 13 and a downstream side wall portion 14. The bottom wall portion 13 has an inclined recessed cross-sectional profile with its deepest portion towards the upstream side wall portion 12. Further, the downstream side wall portion 14 forms a ridge 15. The ridge 15, although not necessary, serves as a barrier ensuring that primary fluid to be guided along the helical groove 4 is guided along the helical groove rather than taking the easy route escaping the helical groove 4 by flooding the ridge 15. Further, the inclined bottom wall portion 13 allows a larger amount of primary fluid to be contained in the helical groove 4 and also an enhanced contact surface with the primary fluid. The helical groove 4 preferably has as seen in a vertical cross section a volume which is adapted to handle a fluid volume which is slightly below an estimated normal primary fluid flow of the flushing assembly. By normal in this case is meant a normal primary fluid flow during intended use such as showering in case the fluid assembly is indented to be used in a shower application. The intention is that the helical groove 4 during normal fluid flow may be filled with primary fluid flowing from the upper inlet 6 toward the lower outlet 7 while being in contact with a lower surface of the heat exchanging member 3 to be further explained below.

A heat exchanging member 3 is arranged on top of the foundation 2 resting directly or indirectly thereon and delimiting a helical channel 16 permitting a first flow of a primary fluid there between.

In the disclosed embodiment the heat exchanging member 3 is constituted by an upper and a lower wall 17a, 17b which are joined to define there between a helical fluid tight channel 18 permitting a through flow of a secondary fluid. The upper and lower walls 17a, 17b are each provided with a helical pressed pattern whereby the helical channel 18 is defined there between. The joining of the two walls may by way of example be made by welding, bonding or brazing.

The helical channel 18 of the heat exchanging member 3 has a pitch corresponding to the pitch of the helical groove 4 of the foundation 2. Further, the geometry of the lower wall 17b of the heat exchanging member 4 mates with the foundation 2 in such manner that when the heat exchanging member 4 is arranged on the foundation 2, the lower surface of the wall 17b of the heat exchanging member 3 and the helical groove 4 of the foundation 2 delimits the through helical channel 16 extending from the upper inlet 6 of the foundation 2 to the lower outlet 7 of the foundation 2. This may be provided by the lower surface of the lower wall 17b of the heat exchanging member 3 resting on the ridge 15 of the helical groove 4 of the foundation 2.

It is preferred that there is an essentially continuous contact surface 19 between the heat exchanging member 3 and the ridge 15 of the foundation 2 whereby the flow of primary fluid will be directed along the thus delimited helical channel 16. A sealing (not disclosed) may be provided along the contact surface 19. The helical channel 18 of the heat exchanging member 3 thus has a pitch corresponding to the pitch of the helical groove of the foundation 2.

In the disclosed embodiment the lower wall 17b forming a bottom wall 28 of the helical channel 16 of the heat exchanging member 3 has a cross sectional profile which at least partly extends down into the helical groove 4 of the foundation 2, i.e. the lower most point P of the bottom wall 28 extends below the ridge 15 of the helical groove 4 of the foundation. Accordingly, when the helical channel 16 is filled with a flow of primary fluid, the bottom wall 28 will be immersed in the primary fluid. This applies even with a low degree of filling, i.e. during a low flow of primary fluid.

In the disclosed embodiment the upper wall 17a of the heat exchanging member 3 forms a helical groove 20. The helical groove 20 has the same pitch as the helical channel 18 of the heat exchanging member 3 and the helical groove of the foundation 2.

The helical channel 18 of the heat exchanging member 3 is provided to a allow a flow of a secondary fluid there through. The flow of the secondary fluid may form a counter-flow in view of the intended flow of primary fluid in the flushing assembly 1. Accordingly, the helical channel 18 comprises a lower inlet 21 and an upper outlet 22. The inlet and outlet 21, 22 are arranged as through holes provided with couplings 23 allowing connection to a supply of secondary fluid. The secondary fluid may by way of example be tap water. In a non disclosed embodiment the couplings 23 may be connected to flexible tubes connecting the inlet and outlets 21, 22 to the secondary fluid. By providing such tubes with an overlong length the couplings 23 must not be disconnected during maintenance of the heat exchanging member.

The flushing assembly 1 may further be provided with a flooring 24. The flooring 24 is in its easiest form made of a sheet 25 arranged resting on top of the frame 9 of the foundation 2. In the disclosed embodiment the flooring 24 is arranged resting on the peripheral boundary of the frame 9 and on central supports 26. The central supports 26 are preferably provided with through openings 60 along its bottom end to allow runoff of primary fluid towards the drainage 33.

The flooring 24 preferably has a structural strength allowing a person to stand on top of the flooring without undue flexing.

The flooring 24 is provided with apertures 27 to allow runoff of primary fluid towards the foundation 2 and the heat exchanging member 3 towards the lower outlet 7 of the foundation 2. The apertures 27 are preferably arranged adjacent the upper inlet 6 of the helical groove 4 of the foundation 2, i.e. in the disclosed embodiment adjacent the periphery of the flooring 24. To further facilitate runoff towards the apertures 27, the flooring 24 may have a crowning (not disclosed) towards the apertures 27.

To facilitate cleaning, the flooring 24 and the heat exchanging member 3 are preferably removable. In its most simple formed the flooring 24 and the heat exchanging member 3 are arranged to be lifted up or pivoted to thereby give access to the foundation 2 and the drainage 33 communicating with the lower inlet 7.

Figure 3:
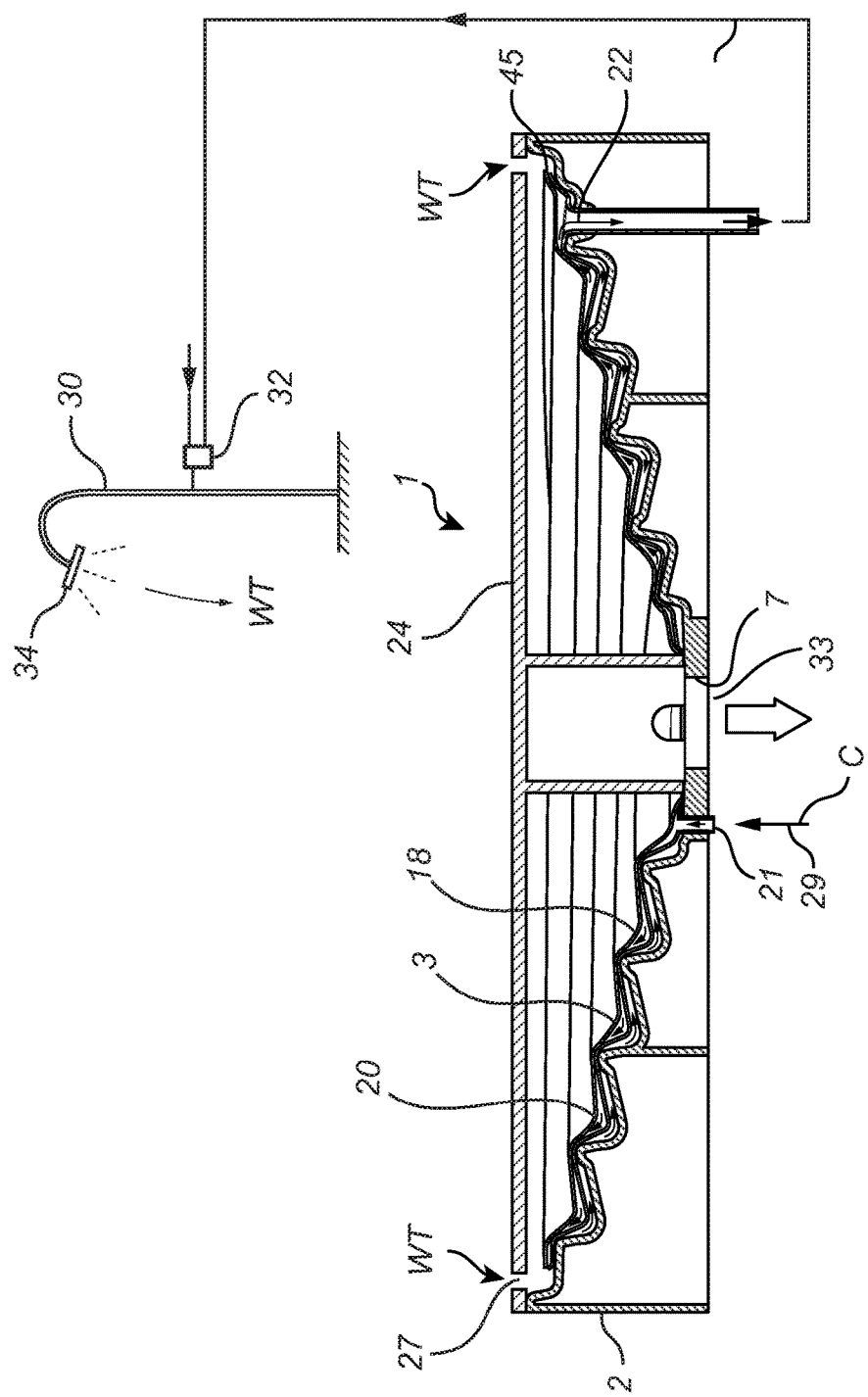
FIG. 3 schematically discloses the operation of the flushing assembly according to the invention.

Now turning to FIG. 3, the operation of the flushing assembly 1 according to the invention will be disclosed. The description will be based on the flushing assembly 1 being used in a shower 30.

The flushing assembly 1 is connected to the shower 30 by an incoming fresh cold water piping 29 that is connected to the inlet 21 of the helical channel 18 of the heat exchanging member 3. The outlet 22 of the helical channel 18 is connected via a piping 31 to a mixer 32 of the shower 30 by which it will be intermixed with warm water W to a desired temperature. Further, the lower outlet 7 of the foundation 2 is connected to a drainage 33.

During operation, fresh cold water C forming the secondary fluid, is supplied to the flushing assembly 1 via the piping 29 and enters the helical channel 18 of the heat exchanging member 3 via the inlet 21. By the inherent pressure of the cold water C the cold water is pressed along the helical through channel 18 towards the outlet 22 and leaves the flushing assembly via the piping 31. The cold water is fed via the piping 31 to the mixer 32 where it is intermixed with incoming fresh warm water W to form tempered warm water WT. The tempered warm water WT is fed to a nozzle 34 of the shower 30 flushing the flooring 24. This tempered warm water WT will constitute the primary fluid of the flushing assembly 1.

The tempered warm water WT will meet the flooring 24 where it is guided towards the apertures 27 for runoff towards the foundation 2. The tempered warm water WT will by a distributor 45 in the form of a raised edge of the heat exchanging member 3 primarily be guided into the helical groove 4 formed between the foundation 2 and the heat exchanging member 3. The tempered warm water WT not finding its way through the helical groove 4 will instead find its way into the helical groove 20 of the upper wall 17a of the heat exchanging member 3. No matter which way the tempered warm water WT will take it will flow towards the lower outlet 7 of the foundation 2 and leave the same via the drainage 33. During its flow towards the lower outlet 7, the tempered warm water WT, i.e. the primary fluid will be in indirect contact with the counter-flow of secondary fluid in the helical channel 18 of the heat exchanging member 3. Thereby heat exchange will take place between the primary fluid being the tempered warm water WT and the secondary fluid being the cold water C. The result will be a tempered cold water CT to be fed to the mixer 32 via the piping 31. This heat exchange will result in an elevated temperature of the cold water CT to be supplied to the mixer 32. Thereby the mixing ratio between cold and warm water may be changed with a possible reduced amount of warm water. Alternatively, the temperature of the warm water W supplied to the mixer 32 may be lowered. Thereby the overall energy consumption may be reduced.

This principle described below is equally applicable no matter if the foundation 2 has a convex or concave bowl shape. The primary fluid will always go from an inlet being positioned above the outlet whereby gravity is used as driving force. Also, the principle is equally applicable to other applications than showers. The flushing assembly is equally applicable in any flushing systems using a tempered water supply such as scavenging systems in general.

The inventive flushing system provides a very easy access to all surfaces and comprises virtually no hidden spots. To be cleaned, the flooring 24 and the heat exchanging member 3 may simply be lifted up and be removed. All surfaces, no matter if it is the foundation 2, the heat exchanging member 3 or the flooring 24 exhibits large, plane or slightly curved surfaces which may be easily wiped off. The inlets and outlets of the helical channel for the secondary fluid may preferably provided with quick couplings allowing a fast and easy installation.

The heat exchanging member may by way of example be formed by hydro forming. One way of doing this is arranging two sheets of metal, one on top of the other. The two sheets are joined by e.g. welding along the intended boundary lines of the helical channel to be formed. Provisional inlets and outlets are mounted to inlet and outlet portions of the helical channel to be formed.

The thus formed two-layered structure is arranged in a mould defining a mirrored three dimensional profile of the helical channel to be formed and the provisional inlets and outlets are connected to a media supply. A suitable media of a very high pressure is supplied via the provisional inlets and outlets. By the pressurized media, a through channel will be plastically formed delimited by the walls of the two sheets and the welded boundary lines. When the desired cross section has been reached, the pressure of the medium is released and the resulting three-dimensional geometry is removed from the mould. The provisional inlets and outlets are removed and replaced with suitable fittings for the secondary fluid.

Another way of producing the heat exchanging member is by providing two sheets, each sheet having a helical channel formed therein. The two sheets are arranged one on top of the other and then joined by welding, bonding or brazing to form boundary lines delimiting the through helical channel. In a yet alternative embodiment the heat exchanging member may be formed as a densely spirally wounded tube, in which the outer wall portions of adjacent wounds are joined to thereby delimit a helical groove.

Provided the foundation instead should have a convex bowl shape, the upper inlet would instead be arranged in the upper central portion of the foundation with a helical groove winding downwards to a lower peripheral portion.

From the description above follows that, although various embodiments of the invention have been described and shown, the invention is not restricted thereto, but may also be embodied in other ways within the scope of the subject-matter defined in the following claims.

The invention claimed is:

1. A flushing assembly comprising a foundation and a heat exchanging member,
   the foundation comprising a bowl shape providing an envelope surface defining an upper inlet and a lower outlet, the lower outlet being arranged to communicate with a drainage,
   and the heat exchanging member comprising a helical channel defined between an upper and a lower wall, the helical channel having an extension along the envelope surface of the bowl shaped foundation, and the helical channel being arranged to be provided with a through flow of a secondary fluid,
   wherein the flushing assembly is configured to provide a helical channel for a primary fluid extending between the envelope surface of the foundation and the lower wall of the heat exchanging member for guiding the primary fluid there through from the upper inlet to the lower outlet towards the drainage, thereby allowing heat exchange between the primary fluid and the secondary fluid.

2. A flushing assembly according to claim 1, wherein the upper and the lower walls of the heat exchanging member are provided by pressed sheet metal, the walls being formed and joined to define said helical channel.

3. A flushing assembly according to claim 1, wherein the helical channel of the heat exchanging member is formed by a pressed pattern in the upper and/or the lower wall of the heat exchanging member.

4. A flushing assembly according to claim 1, wherein the upper surface of the upper wall of the heat exchanging member comprises a helically formed groove facing away from the helical channel.

5. A flushing assembly according to claim 1, wherein the envelope surface of the foundation is provided with a helical groove.

6. A flushing assembly according to claim 5, wherein the helical groove in the envelope surface of the foundation has an extension and pitch corresponding to the helical channel of the heat exchanging member.

7. The flushing assembly according to claim 5, wherein the helical groove in the envelope surface of the foundation has a bottom wall portion, an upstream side wall portion and a downstream side wall portion and wherein the downstream side wall portion comprises a ridge.

8. The flushing assembly according to claim 7, wherein a bottom wall of the helical channel of the heat exchanging member has a cross sectional profile which at least partly extends down into the helical groove of the foundation, and wherein a lower most point of the bottom wall extends below the ridge of the helical groove of the foundation.

9. A flushing assembly according to claim 1, wherein the envelope surface of the foundation and the lower wall of the heat exchanging member are arranged in contact with each other, whereby the envelope surface of the foundation together with the lower wall of the heat exchanging member define the helical channel there between.

10. A flushing assembly according to claim 1, further comprising a flooring arranged above the heat exchanging member.

11. A flushing assembly according to claim 1, further comprising a distributor adapted to primarily guide the primary fluid towards the helical channel extending between the envelope surface of the foundation and the lower wall of the heat exchanging member.

12. A flushing assembly according to claim 1, wherein the heat exchanging member is a hydro formed structure.

13. A flushing assembly according to claim 1, wherein the flushing assembly is a shower flooring or a scavenging plate.

* * * * *